United States Patent [19]
Burgund

[11] 4,342,738
[45] Aug. 3, 1982

[54] HYDROGEN GENERATION AS FUEL BY USE OF SOLAR ULTRAVIOLET LIGHT PROCESS

[76] Inventor: Paul W. Burgund, 2235 Avenue L, Fort Madison, Iowa 52627

[21] Appl. No.: 295,214

[22] Filed: Aug. 21, 1981

[51] Int. Cl.³ .............................................. C01B 13/00
[52] U.S. Cl. .................................. 423/579; 423/648 R
[58] Field of Search ............................ 423/579, 648 R

[56] References Cited
U.S. PATENT DOCUMENTS

| | | | |
|---|---|---|---|
| 4,053,576 | 10/1977 | Fletcher | 423/648 R |
| 4,071,608 | 1/1978 | Diggs | 423/648 R |
| 4,233,127 | 11/1980 | Monahan | 423/648 R |
| 4,272,345 | 6/1981 | Leach | 423/648 R |

*Primary Examiner*—O. R. Vertiz
*Assistant Examiner*—Wayne A. Langel
*Attorney, Agent, or Firm*—Zarley, McKee, Thomte, Voorhees & Sease

[57] ABSTRACT

A feasible and economic method of producing hydrogen and oxygen as potential fuels, from water. The process employs as the energy source, sunlight, which is separated into its infrared portion and its ultraviolet light portion. These are concentrated, and in a first stage the infrared is used to heat the water, under pressure to a superheated steam which is contacted with a steam decomposition catalyst in a chamber which is subjected to concentrated ultraviolet light. The result is separation of the water by a combination of thermal energy and photolytic effect into its component elements, hydrogen and oxygen, which can be collected individually and used as fuel sources.

5 Claims, No Drawings

HYDROGEN GENERATION AS FUEL BY USE OF SOLAR ULTRAVIOLET LIGHT PROCESS

BACKGROUND OF THE INVENTION

With the continuing energy crisis throughout the world, there is a continuing need for new processes for fuel generation. One point of continuing focus for research has been the separation of water into hydrogen and oxygen by decomposition. It is known that such decomposition can occur by electrolysis, by superheating water to the point of molecular disassociation (about 2800° C.) and the like. The trouble with such processes, is that by and large, they all have involved extremely costly energy consumption during the water decomposition step. This, of course, makes them economically unfeasible because of the net energy consumption versus the amount of recovered hydrogen and oxygen.

There is therefore a continuing need, and a real demand, for a process which will provide hydrogen and oxygen as replaceable non-fossil fuels. Moreover, there is a continuing need for such a process which is economical and can be run without high electrical energy costs, nuclear energy costs, or thermal energy costs.

It is a primary object of the present invention to fulfill the obvious demand for a fuel source from readily available water, which can be made without high energy costs.

Another object of the present invention is to provide a process for molecular disassociation of water into its component parts of hydrogen and oxygen which relies exclusively on readily available solar energy.

Another object of the present invention is to provide a solar energy process for decomposition of water which is efficient and economical, primarily because of the use of certain selected decomposition catalyst components which allow the use of solar energy in an efficient manner to accomplish the end result.

A still further object of the present invention is to provide such a process as mentioned in the preceding object, which involves separation of solar energy into its primary thermal energy component (infrared light) and its primary ultraviolet energy component, with the thermal energy component (infrared), being concentrated and used to superheat steam, which is thereafter subjected to photolysis by concentrated ultraviolet light, in the presence of certain water decomposition catalysts.

The method of accomplishing each of these objectives, as well as others, will be apparent from the detailed description of the invention which will follow hereinafter.

SUMMARY OF THE INVENTION

This invention involves separation of water into hydrogen and oxygen, both of which may be used as non-fossil fuel sources. The energy to accomplish the separation is derived from the sun. The solar energy is separated into its infrared portion, and its ultraviolet light portion. The infrared portion is concentrated and utilized to superheat steam in a chamber to temperatures in the order of 800° C. Superheated steam is then subjected to ultraviolet light in the presence of certain water decomposition catalysts wherein molecular diassociation of the water occurs, with the result being hydrogen and oxygen gases. The gases may be separated by conventional means, and used as energy sources.

DETAILED DESCRIPTION OF THE INVENTION

It is, of course, known that solar energy is comprised of both an infrared component, having wavelength frequencies of approximately $10^4$ to $10^6$ angstroms, and an ultraviolet component having wavelengths of approximately $10^2$ to $10^3$ angstroms. It is also, of course, known that sunlight can be separated into these various wavelengths by conventional means.

The amount of ultraviolet light in sunlight is considerably less than the infrared portion and therefore, the ultraviolet light must be concentrated. In particular, the amount of ultraviolet light has been reported in the literature as somewhere between 0.11 to 0.12 of 1% of the sunlight.

It is, of course, also well known that water can be decomposed by thermal energy. In thermal decomposition of water, the molecules of water vapor are heated which gradually increases the level of molecular vibrations, finally achieving the level required for rupture of the molecular bonds and disassociation of the water molecules into their components. At standard pressure, the water disassociation temperature is about 2800° C.

The ultraviolet frequencies of natural light are capable of supplying additional energy excitation of the molecular bonds to achieve molecular disassociation at lower temperatures. Thus, the combination of both thermal and ultraviolet will allow direct disassociation of water molecules at temperatures lower than the standard pressure molecular disassociation temperature of 2800° C.

In addition, in accordance with the process of this invention, certain selected metal, metal oxide and/or metal salt catalysts are employed to achieve an even greater efficiency of molecular disassociation. The net result is believed to be the first ever process which takes full advantage of both thermal and photolytic properties of solar energy, in combination with the catalytic effect of certain metals and oxides and salts of said metals, to allow a highly efficient decomposition process. The overall process steps of each now will be described.

In accordance with the first step, solar energy is collected and separated into its ultraviolet light portion and its infrared light portion. The precise separating means employed is not critical, and such devices are well known. Amongst those which can be used are quartz prisms, a diffraction grating, which is a carefully polished metal or aluminum coated glass with many thousands of parallel lines per inch, (see Jaffee, Michaelson and Speed of Light, published in 1960, by Doubleday, the disclosure relating to diffraction gratings, and incorporated herein by reference). Other means of accomplishing such separation are well known, and may be used.

After the sunlight is separated into its ultraviolet component and its infrared component, each of these components must then be concentrated. Again, concentration of light is well known. It may be accomplished by parabolic concentrators, magnifying glass type concentrators, parabolic reflectors, such as those shown in U.S. Pat. Nos. 4,019,868, and 4,030,890, and 4,053,576. The disclosure of each patent, with respect to light concentrators, is incorporated herein by reference. Fresnel Mirrors may also be employed for concentration.

In accordance with the next step of the present invention, water is placed into a chamber, which simply is an enclosed vessel with an exit tube steam line. The enclosed vessel, reactor or chamber with the exit tube steam line, is then subjected to the concentrated infrared light causing the water to boil. When the water boils, it passes through the exit steam line into a second reactor similar to the first, except that the second reactor is maintained under pressure, of at least one atmosphere. In the second reactor, the reaction chamber has at least one wall which is transparent to ultraviolet light. A suitable vessel may be a steel enclosed vessel with at least a portion of one wall being made of quartz, with the vessel having an insulating liner. The quartz is transparent to ultraviolet light. In the second vessel, more concentrated infrared light is subjected to the water in the vessel and then concentrated ultraviolet light is subjected to the water. The water is superheated up to temperatures of about 800° C. by the thermal energy of the infrared light. Simultaneously, the superheated steam is subjected to ultraviolet light.

The interior of the container has a series of screens for holding a finely divided water decomposition catalyst or the screens themselves may be made of the catalyst material. The employment of the water decomposition catalyst within the second chamber is a critical aspect of this invention. The catalysts may generally be described as heavy metals, or salts or oxides of heavy metals. The term "heavy metals" as used herein refers to those of Group IIIB, IVB, VB, VIB VIIB and VIIIB of the Periodic Chart and includes, among others, the following ones: Titanium, titanium oxides and titanium halides, zirconium, zirconium oxides and halides, and oxides and halides of other transition metals like thorium, thallium, tin and tungsten.

In particular, the most preferred catalysts are the transition metals, and the oxides and halide salts of transition metals.

Except as otherwise limited herein, the term "salt" or "salts" designates a compound having a heavy metal of the groups listed heretofore of the Periodic System. It is employed in its broadest sense to connote the reaction product between a base and an acid, including products of the type "alcoholates" which might be thought of as mixed inorganic-organic salts. Most preferably the metals are titanium, tin, thallium, thorium, terbium, tellurium, technetium, tantalum, selenium, zirconium, hafnium, thorium, vanadium, tungsten, and molybdenum. While it is preferred that either the oxide or the chloride salt be employed, other halogens such as the bromides or the flourides may be used, and oxy-halogenides may be used, for example, oxychlorides, and also mixed compounds such as mono-, di- or tri- halogenoalcoholates. As heretofore mentioned, the catalyst is preferably in a finely divided state, but may also be pelletized.

The superheated steam at temperatures within the range of 800° C. or above, is contacted with the steam composition catalyst, typically testing on screens within the steam chamber. Simultaneously therewith, the concentrated ultraviolet light is directed into the chamber. The concentrated ultraviolet light, passes through the ultraviolet transparent wall, typically made of quartz crystals, and bombards the agitated molecular bonds of the water vapor molecules. The ultraviolet light directly excites the vibrational level of the molecular bonds beyond the level required for fracturing the molecular bonds, resulting in the disassociation of the water molecules into elemental hydrogen and oxygen.

The additional energy of the concentrated ultraviolet portion of the sunlight, combined with the use of the highly effective decomposition catalyst of this invention allow highly efficient decomposition with lower energy levels than heretofore. Thus, the concentrated ultraviolet energy in combination with the high levels of thermal energy supplied by the infrared light and in further combination with the highly effective steam decomposition catalysts as described, give a rate of disassociation of the molecules with greater energy utilization and efficiencies than heretofore achieved without the direct combined three effects. That is, solar energy broken into its infrared portion, and its ultraviolet portion in combination with highly effective steam decomposition catalysts achieve energy savings and efficient rate of decomposition to elemental hydrogen and oxygen. Thus, the present invention takes full advantage of both thermal and photolytic properties of solar energy in combination with chemical catalytic effect of steam decomposition catalysts. This has not heretofore been achieved.

The description above provides for two chambers, one for steam generation from water and a second for superheating and steam decomposition. If desired, the function of the second chamber can be split in two. That is to say, the steam can be superheated in a second chamber and then passed into an ultraviolet light transparent chamber of quartz or the like containing the steam decomposition catalyst.

The combined hydrogen and oxygen gas, after the decomposition heretofore described, passes out of the second reactor or chamber into a conventional Venturi tube which reduces the pressure. As is well known, such Venturi tubes involve an exit line having an increased diameter in order to reduce the pressure. After the pressure is reduced, the gases are now ready for separation and collection individually.

There are a variety of conventional methods by which the hydrogen may be separated from the oxygen. For example, it may be separated by diffusion through a hydrogen permeable membrane, or use of a molecular sieve, such as a silver palladium, or finely woven mesh membrane of iridium, thorium, or other heat resistant refractory oxides. In addition, it may be separated by the gravity density technique by which the differential in atomic weights or densities of hydrogen and oxygen is utilized to move the elements away from each other, by the force of gravity in a vertical tank. This results in oxygen being drawn off at the bottom and hydrogen being drawn off at the top. Another means is compression liquification in which a mixture of disassociated gases is compressed, are then passed through a porous plug and the constituent gases separated in a reverse distillation process, as cryogenic liquids. Other alternative separation techniques that may be employed include: diffusion through an oxygen permeable membrane, magnetic separation, ionic charge separation through mass spectroscopy, hydrogen absorption, oxygen absorption and solubility separation.

EXAMPLE

The following example is offered to illustrate, but not limit, the process of this invention. Because of the constraints of equipment availability and the difficulty of complete industrial set-up, the invention was performed on a laboratory scale utilizing heat coils for the water heating to simulate the infrared thermal energy heating of water, and a mercury vapor ultraviolet lamp to simulate the ultraviolet light photolytic effect upon generated and super heated steam in a catalyst chamber. In particular, water was placed in a first chamber (about one quart) and that chamber was a closed vessel with an exit line to a second chamber. The chamber was heated by electrical coils until the water boiled. The steam then passed through the exit line to a second chamber, where it was superheated to a temperature of about 800° C., again with the infrared heating being simulated by electrical coils. After the steam was superheated to about 800° C. it then passed out of the second chamber into a third vessel which was a quartz tube to allow ultraviolet light to pass into the tube. Inside of the quartz tube was finely divided steam decomposition catalyst titanium dioxide, with the amount not being precisely measured, but being between 5 and 10 grams. While the steam was in this ultraviolet light transparent vessel, the mercury vapor ultraviolet light was turned on and the tube was continually subjected to ultraviolet light. The superheated steam at a temperature of about 800° C. contacted the titanium dioxide catalyst, and because of the photolytic effect of the ultraviolet light, decomposed into its hydrogen component and its oxygen component. The hydrogen and oxygen were then bubbled through water and collected.

Thus, it can be seen that this laboratory simulation of the overall process of the present invention demonstrates the feasibility of use on an industrial scale to separate hydrogen and oxygen by an economically feasible method which combines both thermal disassociation effect and photolytic disassociation effect at low energy levels by use of the steam decomposition catalysts of the present invention.

Thus, it can be seen that the invention accomplishes at least all of its stated objectives.

What is claimed is:

1. A feasible economic method of producing hydrogen and oxygen from water, said method comprising:
   separating sunlight into ultraviolet light and infrared light;
   concentrating said separated infrared light and said separated ultraviolet light;
   placing water in an enclosed reactor vessel;
   using said separated and concentrated infrared light as a heat source to convert water to steam;
   placing said steam in a second reactor vessel which is at least partially transparent to ultraviolet light and continually subjecting said steam to infrared light to superheat said steam to catalytic decomposition temperatures of about 800° C.;
   contacting said superheated steam, with a steam decomposition catalyst comprising a finely divided heavy metal, or a salt or oxide of a heavy metal selected from the group consisting of Group IIIB, Group IVB, Group VB, Group VIB, Group VIIB and Group VIIIB of the Periodic Chart;
   introducing said concentrated ultraviolet light into said second reactor to separate said steam, in the presence of said decomposition catalyst, into its component parts of hydrogen and oxygen;
   and collecting the hydrogen and the oxygen.

2. The process of claim 1 wherein the steam decomposition catalyst is a finely divided heavy metal, or salt or oxide of a heavy metal selected from the group consisting of titanium, tin, thallium, terbium, tellurium, technetium, tantalum, selenium, zirconium, hafnium, thorium, vanadium, tungsten and molybdenum.

3. The process of claim 2 wherein said second reactor vessel has at least a portion of one wall formed of ultraviolet light transparent quartz.

4. The process of claim 3 wherein the component parts of hydrogen and oxygen in said second reactor are passed through a Venturi tube prior to collection.

5. The process of claim 4 wherein said hydrogen and oxygen are separated to provide elemental hydrogen and elemental oxygen.

* * * * *